Patented Apr. 7, 1925.

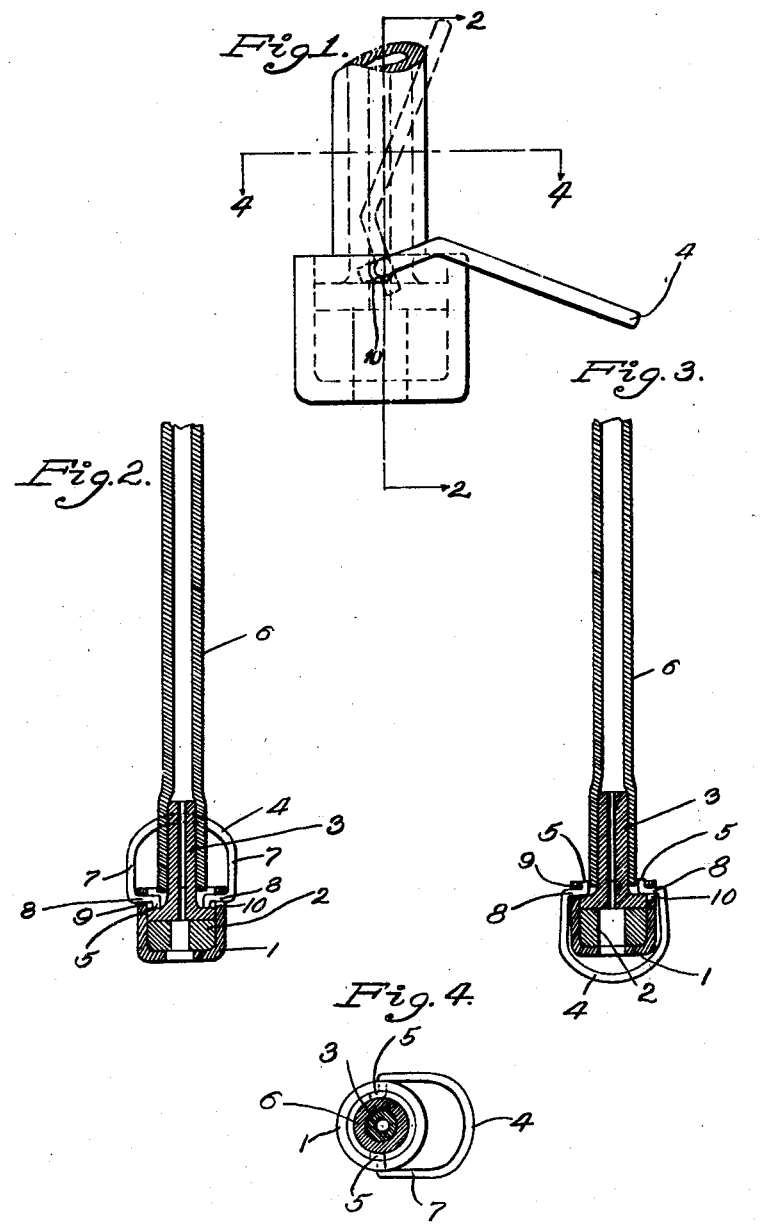

1,532,352

UNITED STATES PATENT OFFICE.

SAMUEL A. SNELL, OF ST. LOUIS, MISSOURI, ASSIGNOR TO MOON BROTHERS MANUFACTURING COMPANY, OF ST. LOUIS, MISSOURI, A CORPORATION OF MISSOURI.

HOSE COUPLING.

Application filed November 25, 1921. Serial No. 517,684.

*To all whom it may concern:*

Be it known that I, SAMUEL A. SNELL, a subject of the King of Great Britain, residing at St. Louis, Missouri, have invented a certain new and useful Improvement in Hose Couplings, of which the following is a full, clear, and exact description, such as will enable others skilled in the art to which it appertains to make and use the same, reference being had to the accompanying drawings, forming part of this application.

My invention consists in a hose coupling such as will be most likely used in connecting a pump to the valve stem of bicycle or automobile tires. The ordinary hose coupling of this type is attached to the valve stem by a threaded cap which is screwed onto the valve stem. The proximity of the wheel spokes, the wear on the threads and the delay occasioned by screwing on the coupling, all serve to make desirable a coupling which can be instantly secured to the stem or released therefrom. Various cam and lever devices have been proposed and some are now in service, but are objectionable either from operative defects or cost of manufacture.

The object of my invention is to provide a simple efficient coupling of the latter type which is economical to manufacture and durable in heavy use.

In the accompanying drawings which illustrate a selected embodiment of my invention—

Figure 1 is a side elevation of the coupling attached to a piece of rubber hose.

Figure 2 is a vertical section on the line 2—2 of Figure 1, showing the coupling in clamped position.

Figure 3 is a section similar to that shown in Figure 2, but with the coupling in released position.

Figure 4 is a horizontal section on line 4—4 of Figure 1.

The coupling includes a cylindrical cup 1, a collar 2 of rubber or other compressible material seated in the bottom of cup 1, a stem 3 having a head which bears against the upper face of collar 2, and a double actuating lever 4 provided with cam-like ends 5.

Cup 1, collar 2 and stem 3 have an axial passageway for the delivery of air from the pump tube 6. Member 4 preferably consists of a piece of spring wire bent into a U-shape, the legs 7 of the U adjacent to each end bent inwardly toward each other at 8 and then downwardly at 5 parallel to the U legs. Cup 1 is provided with openings 9 and 10, located diametrically opposite each other and opening 10 is large enough to permit the offset end 5 of lever 4 to pass transversely therethrough. The upper surfaces of openings 9 and 10 form fulcrums for the divided lever.

When member 4 is pushed upwardly from the position shown in full lines in Figure 1, the cam ends 5 engage the upper surface of the head of stem 3 and force it downwardly, thereby compressing collar 2. Obviously the pressure on collar 2 forces the material inwardly as indicated in Figure 2, which will serve to tightly grip any inserted element such as the valve stem of a tire.

By referring to Figure 1, it will be noted that the legs of member 4 near their ends are positioned in a common plane which is inclined to the plane in which the remainder of the member is located. As a result of this bending of the member legs when the lever is raised to the position indicated by dot-and-dash lines in Figure 1, the line of pressure created by the elasticity of collar 2 is to the right of the lever fulcrum which tends to thrust the upper end of the lever to the left, and as the upper end of the lever engages stem 3 or the hose mounted thereon, the coupling is securely locked in clamped position.

The engagement of the head of stem 3 at diametrically opposite points enables the stem to be moved axially of the coupling and avoids sticking and undue wear such as is likely to result from a single central application of the compressing force or from a single application of the compressing force at one of the sides of the stem.

The parts of the device may be manufactured at very small cost and the labor and consequent expense of assembly is correspondingly small. There are no fittings or machining required and there are no parts to require repair or replacement due to hard usage.

The details of my device may be modified in shape and proportions without departing from the spirit of my invention as expressed in the following claims.

I claim:

1. In a hose coupling, a cup, a compressible collar seated therein, a U-shaped lever for compressing said collar, the legs of which are pivoted on said cup and are provided with cam-like terminals which lie in a plane inclined to the plane containing the remainder of the lever whereby when the collar is compressed, the manually manipulated end of the lever is forced against the hose attached to the coupling to lock the coupling in collar-compressing-position.

2. In a hose coupling, a cup, a compressible collar seated therein, a collar compressing lever comprising a spring wire bent into U-shape with the ends of its legs offset to provide a fulcrum bearing and a cam terminal, said cup being provided with openings for receiving said wire, one of which openings is enlarged to permit passage of the offset cam terminal of the lever laterally.

In testimony whereof I hereunto affix my signature this 22nd day of November, 1921.

SAMUEL A. SNELL.